United States Patent
Yamada et al.

(10) Patent No.: US 9,300,180 B2
(45) Date of Patent: Mar. 29, 2016

(54) MOLDED MOTOR

(71) Applicant: FUJITSU GENERAL LIMITED, Kawasaki-shi, Kanagawa-ken (JP)

(72) Inventors: Masaki Yamada, Kawasaki (JP); Masanori Murakami, Kawasaki (JP); Tsugiyoshi Ono, Kawasaki (JP)

(73) Assignee: FUJITSU GENERAL LIMITED, Kawasaki-Shi, Kanagawa-Ken (JP)

( * ) Notice: Subject to any disclaimer, the term of this patent is extended or adjusted under 35 U.S.C. 154(b) by 436 days.

(21) Appl. No.: 13/848,398

(22) Filed: Mar. 21, 2013

(65) Prior Publication Data

US 2013/0249329 A1  Sep. 26, 2013

(30) Foreign Application Priority Data

Mar. 23, 2012 (JP) ................. 2012-067461

(51) Int. Cl.
  *H02K 5/08* (2006.01)
  *H02K 5/02* (2006.01)
  *H02K 3/50* (2006.01)
  *H02K 5/15* (2006.01)
  *H02K 3/34* (2006.01)

(52) U.S. Cl.
  CPC ................. *H02K 5/02* (2013.01); *H02K 3/345* (2013.01); *H02K 3/50* (2013.01); *H02K 5/08* (2013.01); *H02K 5/15* (2013.01)

(58) Field of Classification Search
  None
  See application file for complete search history.

(56) References Cited

U.S. PATENT DOCUMENTS

| | | | | |
|---|---|---|---|---|
| 3,482,125 | A | * | 12/1969 | Fleckenstein .................... 310/51 |
| 7,382,075 | B2 | * | 6/2008 | Wang et al. .................... 310/194 |
| 2002/0057025 | A1 | * | 5/2002 | Mademba-Sy et al. ......... 310/91 |
| 2006/0033395 | A1 | * | 2/2006 | Izumi et al. .................... 310/208 |
| 2010/0181863 | A1 | * | 7/2010 | Murakami et al. ............. 310/215 |
| 2010/0194214 | A1 | * | 8/2010 | Takahashi et al. .............. 310/43 |
| 2012/0019080 | A1 | * | 1/2012 | Kottmyer et al. .............. 310/43 |

FOREIGN PATENT DOCUMENTS

| JP | 2010-148191 A | 7/2010 |
|---|---|---|
| JP | 2010-166739 A | 7/2010 |

* cited by examiner

*Primary Examiner* — Tran Nguyen
(74) *Attorney, Agent, or Firm* — Manabu Kanesaka

(57) ABSTRACT

A molded motor includes an annular yoke part, a stator including a stator core having, a plurality of teeth parts extending from an inner peripheral surface of the annular yoke part toward a center thereof, an insulator covering the stator core, an outer shell formed around the stator core and the insulator and made of resin, a rotor coaxially disposed at the center of the stator, a connecting wire guide provided on the insulator to stand in an axial direction of the stator core at a position corresponding to an engagement recess of an outer peripheral part of the outer shell, and a connecting wire guided by the connecting wire guide. A crimped part of a bracket adapted to be attached to an end face of the stator is engaged with the engagement recess when a part of a side end face of the bracket is crimped and secured.

10 Claims, 4 Drawing Sheets

MOLDED MOTOR

CROSS-REFERENCE TO RELATED APPLICATIONS

The present application is based on, and claims priority from, Japanese Application Serial Number JP2012-067461, filed Mar. 23, 2012, the disclosure of which is hereby incorporated by reference herein in its entirety.

TECHNICAL FIELD

The present invention relates to a molded motor that is an inner rotor electric motor, the outer periphery of which is molded with a synthetic resin, and in particular to attachment of a bracket to a stator.

BACKGROUND ART

Such an inner rotor electric motor includes a stator having a plurality of tooth parts extending from an inner peripheral surface of an annular yoke part toward the center, and a rotor coaxially disposed at the center of the stator. The stator generally has a stator core made of a magnetic substance, and the stator core is insulatably covered with an insulator except for tooth surfaces.

With respect to an insulator, in a molded motor descend in Japanese Patent Application Publication No. 2010-148191, 24 insulator members per tooth part at 12 locations in Japanese Patent Application Publication No, 2010-148191) are fitted onto a stator core on either side thereof piece by piece and a coil is wound around each tooth part.

As found in Japanese Patent Application Publication No. 2010-166739, a stator core is wrapped with a winding, and thereafter an outer shell is formed to entirely cover a stator by resin one piece molding. A circuit board or the like is then assembled and brackets are provided to close openings, completing the stator.

In general, a bracket is formed in a so-called cup shape so as to cover an axial end face of a stator up to a part of an outer peripheral surface. The bracket is generally fixed to the stator with a part of its end deformed by crimping.

An engagement groove is provided on the outer peripheral surface of the stator as a receiver for the part deformed by crimping. A conventional engagement. groove has been formed by cutting a part of the outer peripheral surface after molding of an outer shell by milling or the like.

Cutting an engagement groove, however, causes shavings, which requires a post treatment.

An object of the invention, therefore, is to provide a molded motor that can provide size reduction as a whole while qualify of the motor is maintained.

SUMMARY OF THE INVENTION

In order to attain the above. object, the present invention has the following features: in a molded motor including: a stator including a stator core having a plurality of tooth parts extending from an inner peripheral surface of an annular yoke part toward the center, and an insulator insulatably covering the stator core with tooth surfaces of the tooth parts left uncovered, wherein an outer shell is formed around the stator core and the insulator by resin one piece molding; and a rotor coaxially disposed at the center of the stator, the molded motor including: a connecting wire guide provided on the insulator in a standing manner in an axial direction of the stator core, a connecting wire being guided by the connecting wire guide; and an engagement recess with which a crimped part of a bracket to be attached to an end face of the stator is engaged when a part of a side end face of the bracket is crimped and secured, wherein the engagement recess is formed in concurrence with formation of the outer shell on an outer peripheral surface of the outer shell at a position corresponding to the connecting wire guide.

In this way, the engagement recess, which has been formed by cutting, can be integrally formed at the time of molding.

The connecting wire guide is characterized by a side surface on an inner diameter side formed in an arch shape as a guide surface for the connecting wire. This facilitates introduction of the connecting wire to the inner diameter side.

Furthermore, the connecting wire guide is arranged on the inner diameter side from the outer periphery of the insulator. In this way, a sufficient amount of molded resin layer can be left even though the engagement recess is provided so as to maintain the outer shell strength.

The engagement recess is formed in a trapezoidal shape such that an opening width progressively decreases radially inward from the outer peripheral surface of the outer shell. In this way, both the thickness of a mold resin between the connecting wire guide and the engagement recess and the depth of the engagement recess can be secured.

Furthermore, the engagement recess is located at a position to avoid a gate position and the over flow position at the time of molding of the outer shell. In this way, the structure of as mold can be simplified.

Still further, an insulating cover is provided on an end of the stator for insulating a terminal pin extending in a standing manner from the end of the stator, and the outer shell is provided with a meshing section that meshes with a part of the insulating cover. The engagement recess is provided at a position where it does not coincide with the meshing section radially nor axially. In this way, damages to and misalignment of the insulating cover can be prevented.

DETAILED DESCRIPTION

An embodiment of the invention will now be described with reference to the drawings, although the present invention is not limited to the embodiment.

Figure 1A:
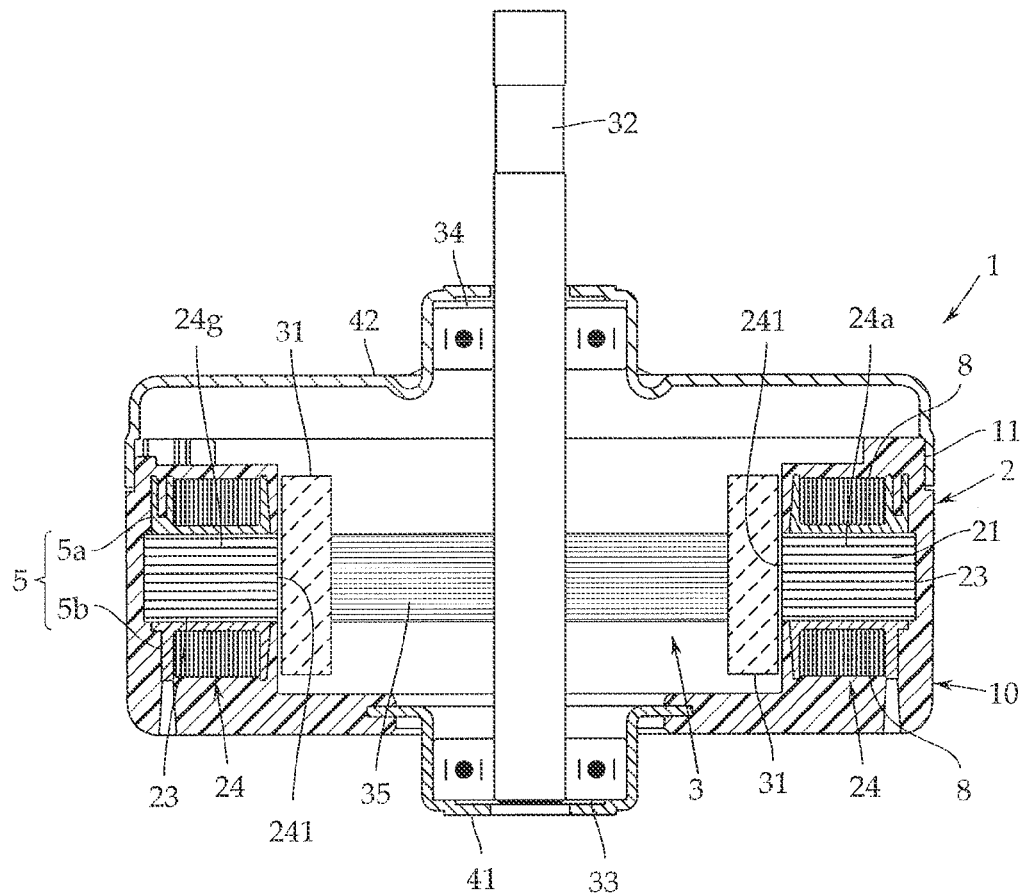
FIG. 1A is a sectional view illustrating a prominent feature of a molded motor according to an embodiment of the present invention.

As shown in FIG. 1A, a molded motor 1 includes a ring-shaped stator 2 and a rotor 3 coaxially disposed at the center of the stator 2. The stator 2 is covered with an outer shell 10 made of resin by resin one piece molding accomplished in a mold so as to leave tooth surfaces 24*l* uncovered.

On one of end faces of the stator 2 (bottom side in FIG. 1), a first bracket 41 is provided, in which a bearing 33 for a rotor output shaft 32 of the rotor 3 is housed. A driving circuit board (not shown) is mounted on the other end face of the stator 2

(top side in FIG. 1), and a second bracket 42 is further provided so as to cover the circuit board. Inside the second bracket 42, another bearing 34 is housed.

In the present invention, the rotor 3 includes the rotor output shaft 32 rotatably supported by the bearings 33 and 34, a disk-shaped back yoke 35 coaxially attached to the rotor output shall 32, and a plurality of plate-shaped rotor magnets 31 located on the outer diameter side of the back yoke 35.

The first bracket 41 is, for example, a shaped component of stainless alloy, and formed as a cylindrical component with a small diameter containing the bearing 33 in its center. The first bracket 41 is integrally embedded in the outer shell 10. The second bracket 42 is also a shaped component of stainless alloy, and formed as a cylindrical component with a large diameter that contains the bearing 34 in its center and covers the. stator 2 from one end thereof to a part of the outer peripheral surface.

Figure 1B:
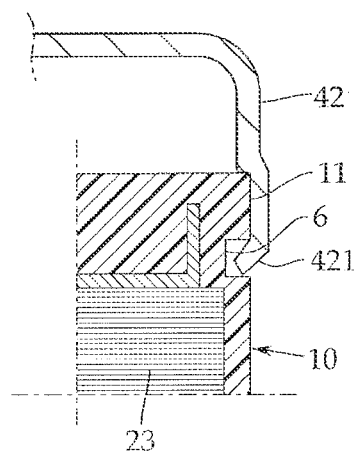
FIG. 1B is a partially enlarged sectional view illustrating a stator and a bracket connected together.
Figure 2:
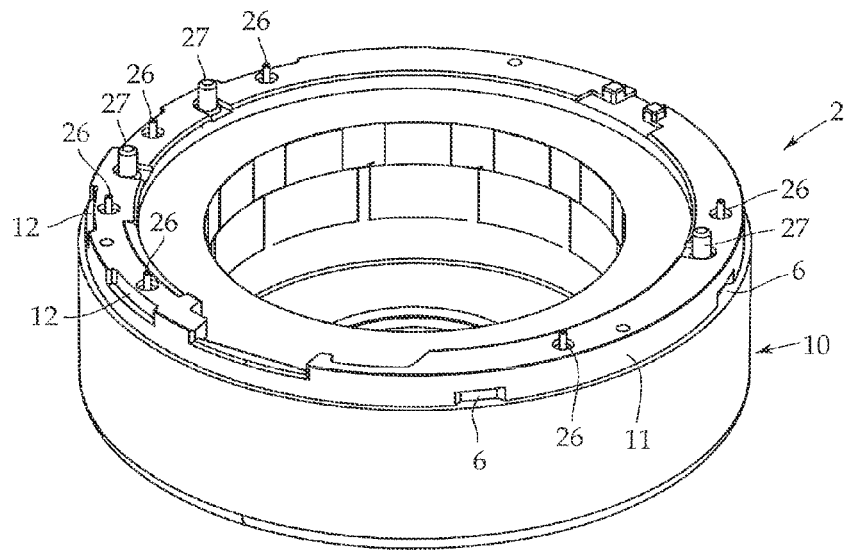
FIG. 2 is a perspective view of the stator of the molded motor.

As shown in FIGS. 1B and 2, the second bracket 42 has a crimped part 42*l* formed by crimping on a part of the periphery. The crimped part 42*l* is adapted to secure the stator 2 by interfering in an engagement recess 6, which will be described later. In this example, crimping refers to metal working in which a part of the periphery of the second bracket 42 is forcedly bent from outside toward inside to form the crimped part 42*l*.

In the present invention, the configurations of the rotor 3 and each of the brackets 41. and 42 are arbitrary matter and the specific mode thereof may vary depending on specifications.

Figure 3:
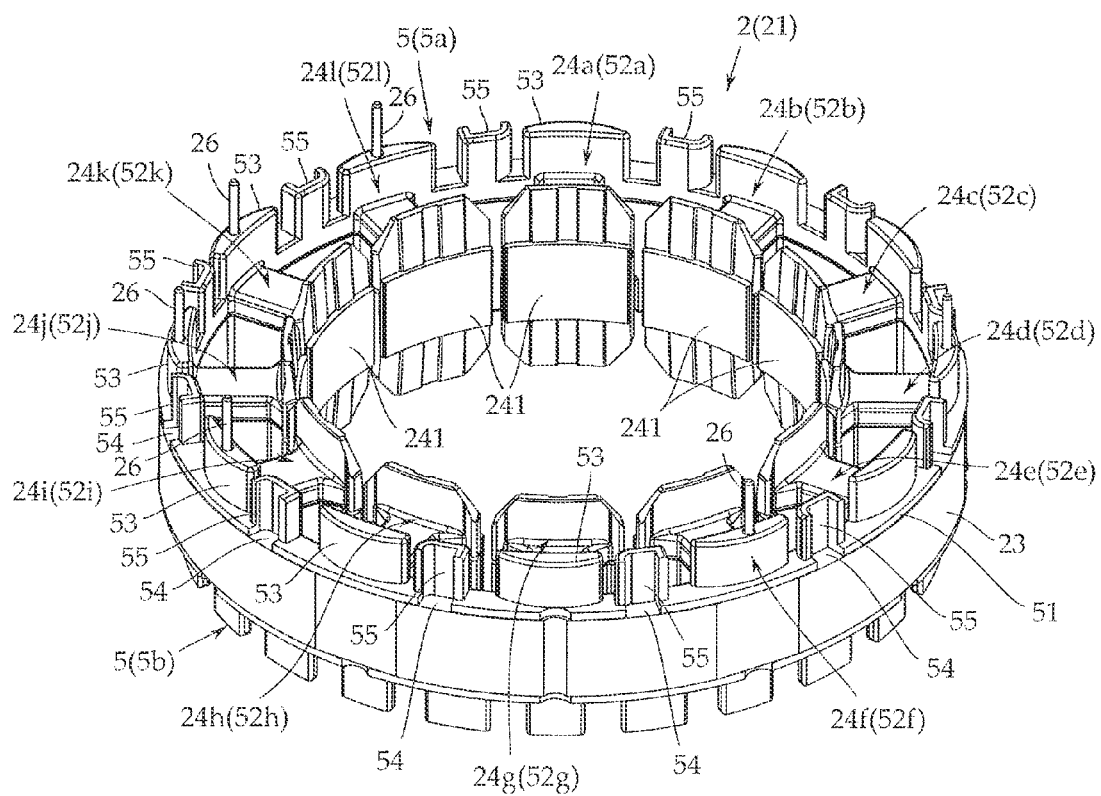
FIG. 3 is a perspective view of a stator core of the stator.

Also with reference to FIG. 3, the stator 2 includes a stator core 21 consisting of a laminate of electromagnetic steel sheets and an insulator 5 insulatably covering the stator core 21. In this example, while the stator core 21 consists of a laminate of electromagnetic steel sheets, cores produced in any other way such as a dust core may be used as long as they retain basic functionality as the stator core 21. Note that lines typical of a laminate are omitted in FIGS. 2 and 3.

The stator core 21 includes an annular yoke part 23 and a plurality of tooth parts 24*a* to 24*l* (12 poles in this example) protruding from an inner peripheral surface of the annular yoke part 23 toward the center. A tooth surface 24*l* is provided on a distal end of each of the tooth parts 24*a* to 24*l*, facing another tooth surface 24*l* along a magnet surface 31 of the rotor 3 with a predetermined clearance therebetween. The number of poles of the tooth parts 24*a* to 24*l* may vary depending on specifications.

As shown in FIG. 3, the insulator 5 includes a pair of upper and lower insulator members 5*a* and 5*b* axially attached to the stator core 21 on either side thereof. The insulator 5 is a molded component of synthetic resin having insulating properties. Examples of synthetic resin having insulating properties include PBT (Polybutylene terephthalate), PET (Polyethylene terephthalate), and PA (Polyamide).

In this example, the insulator members 5*a* and 5*b* are basically in the same form except whether it has a cutout 54 or not, which will be described later. Hereinafter, therefore, only one insulator member 5*a* (hereinafter, first insulator member 5*a*) will be described and specific descriptions on the other insulator member 5*b* (hereinafter, second insulator member 5*b*) will be omitted.

The first insulator member 5*a* includes an end plate 51 covering the annular yoke part 23 of the stator core 21, and a plurality of drum part 52*a* to 52*l* protruding from the inner peripheral surface or the end plate 51 radially toward the center and covering the outer peripheral surface so as to leave tooth surfaces 24*l* of the respective tooth parts 24*a* to 24*l* uncovered.

The end plate 51 is formed in a circular shape and axially along and in contact with an end face of the annular yoke part 23. On a front face (opposite to a surface facing the annular yoke part 23) of the end plate 51, a plurality of bridge parts 53 are provided for guiding a connecting wire (not shown) that connects together coils wound around the tooth parts 24*a* to 24*l*. In this example, the bridge parts 53 are provided at 12 locations of the respective tooth parts 24*a* to 24*l* on the side of the annular yoke part 23.

The bridge parts 53 extend axially and substantially vertically in a. standing manner from an end face of the end plate 51 and formed in a flat arc shape when viewed along the axis of rotation. The bridge parts 53 may take any other shape than the example, and in the present invention, the configuration of the bridge parts 53 is arbitrary matter.

The first insulator member 5*a* is provided with a cutout 54 for exposing a part of an end face of the stator core 21 as a support for the stator core 21 in a mold (not shown) at the time of molding.

The cutout 54 is cut out in a channel shape from the outer peripheral surface toward the inner peripheral surface of the end plate 51. Instead of a channel shape, the cutout 54 may be in a semicircular shape. In this example, the cutouts 54 are provided at 12 locations between tooth parts 24*a* to 24*l*.

The end plate 51 is further provided with a connecting wire guide 55 for enhancing the stiffness of the insulator 5 lowered due to formation of the cutout 54 and for guiding a connecting wire of the coil 8. The connecting wire guides 55 are arranged along the outer periphery of the cutout 54 around the cutout 54.

The connecting wire guide 55 extends axially and substantially vertically in a standing manner from the front face of the end plate 51 and formed in a channel shape in cross section. An inner peripheral surface 55*a* of the connecting wire guide 55 (on the outer diameter side when viewed in a radial direction of the stator 2) is formed in a channel shape conforming to the shape of the cutout 54. In this way, a side surface on the inner diameter side is formed in an arch shape as a guide surface for a connecting wire, which facilitates introduction of the connecting wire to the inner diameter side, In the present invention, the specific shape of a reinforcing rib is an arbitrary element.

Figure 5:
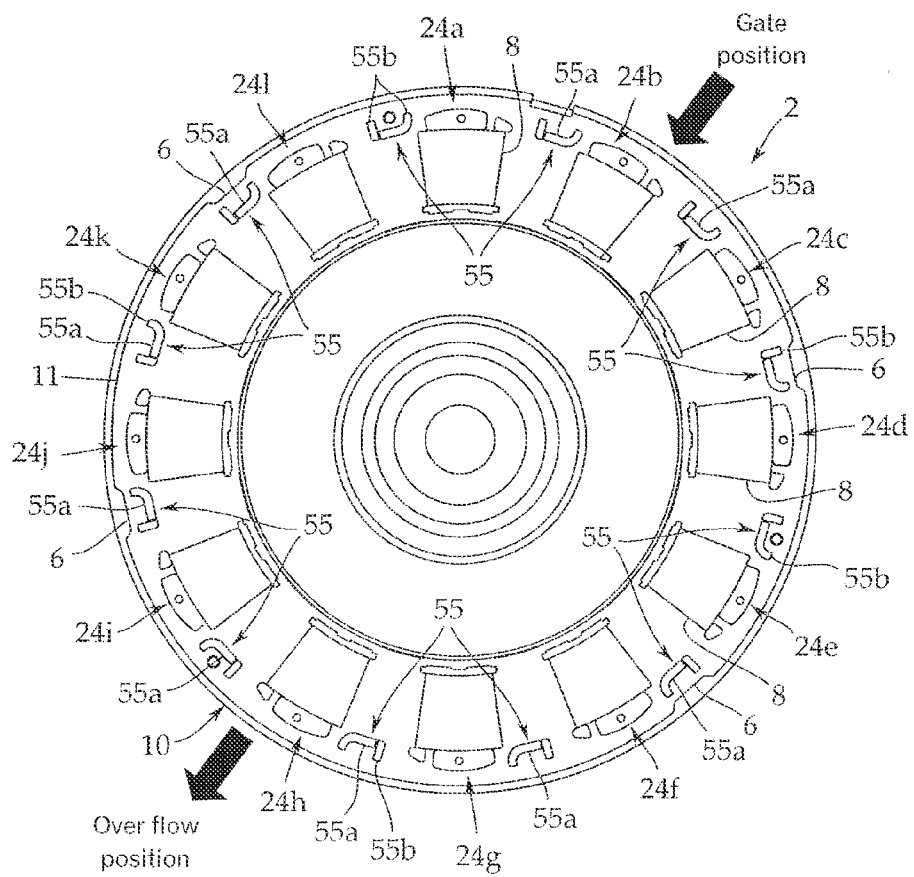
FIG. 5 is an end face view taken along the line A-A in FIG. 4.

Also with reference to FIG. 5, radially outward ends 55*b*, 55*b* of the connecting wire guide 55 is preferably located on the inner diameter side from the outer peripheral surface of the end plate 51. Since the radially outward end 55*b* of the connecting wire guide 55 is located on the inner diameter side from the outer peripheral surface of the end plate 51, a sufficient amount of molded resin layer of the stator 2 can be left even though the engagement recess 6 is provided as described later, so as to maintain the outer shell strength.

As shown in FIG. 2, on an end of the stator 2, or an upper end in FIG. 2, an attachment stepped surface 11 is provided for attaching the second bracket 42. The attachment stepped surface 11 is lowered in the radial direction so that when the second bracket 42 is attached, the outer peripheral surface of the second bracket 42 and that of the outer shell 10 are flush with each other.

In this example, the outer diameter of the attachment stepped surface 11 is slightly larger than the inner diameter of the second bracket 42 so that the second bracket 42 is press-fitted to the attachment stepped surface 11.

Figure 4:
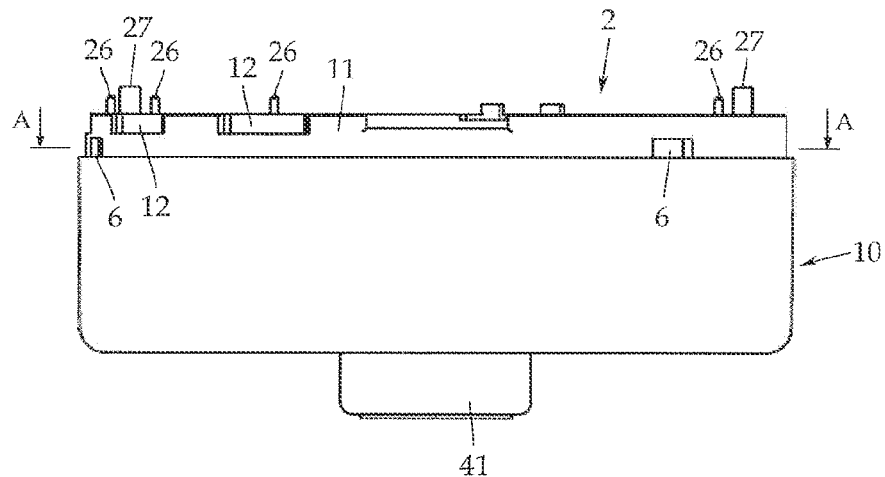
FIG. 4 is an elevation of the stator of the molded motor.

Further with reference to FIGS. 4 and 5, the engagement recess 6 is provided on the attachment stepped surface 11 of the stator 2 for attaching the second bracket 42. in this example, the engagement recesses 6 are provided on the attachment stepped surface 11 at 4 locations spaced at a predetermined interval.

The engagement recess 6 is formed in a trapezoidal shape such that an opening width progressively decreases radially inward from the outer peripheral surface of the outer shell. In this way, a mold resin between the connecting wire guide 55 and the engagement recess 6 can be as thick as possible.

Furthermore, the engagement recesses 6 are each located at a position to avoid a gate position and the over flow position at the time of molding of the outer shell 10. As shown in FIG. 5, the gate position is located on the upper right hand side in this example. The over flow position is located on the lower left hand side. In this way, molten resin, which has been injected into is mold from the gate position, flows toward the over flow position on the opposite side via the center (thick arrows in FIG. 5)

The gate position provided for injecting resin into a mold at the time of molding and the over flow position provided for allowing part of the resin with which the mold is filled to escape therefrom are both precisely designed and managed according to requirements for molding. If the engagement recess 6 was to be provided near the positions, the structure of the mold would be complex. As a result, costs for designing the mold would undesirably increase. In this embodiment, therefore, the structure of a mold can be simplified because the engagement recess 6 is provided at a distance from both the gate position and the over flow position.

Figure 6:
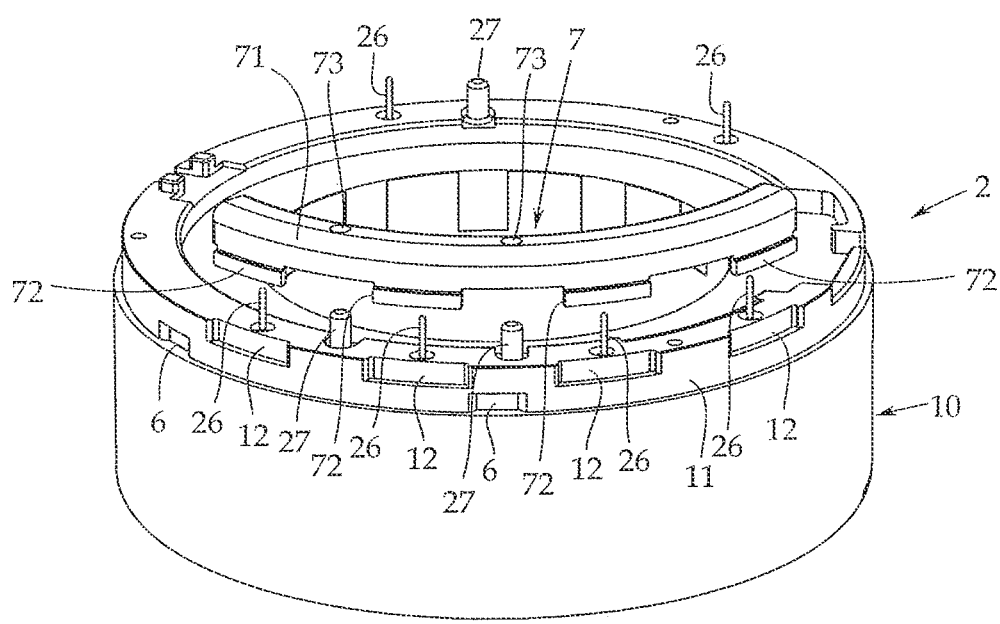
FIG. 6 is an exploded perspective view illustrating how the stator and an insulating cover are connected together.

As shown in FIG. 6, on an end of the stator 2 (upper end in FIG. 6), a. terminal pin 26 that is electrically connected to a winding (not shown) of the stator core 21, and a boss 27 serving as a guide for attaching an insulating cover 7, as described later, are provided. The insulating cover 7 is also attached to the end of the stator 2 (upper end in FIG. 6) as a separate entity for insulating the terminal pin 26.

In this example, terminal pins 26 are provided at 6 locations and the insulating cover 7 is attached so as to cover 4 of 6 terminal pins 26. The bosses 27 are provided at 3 locations and 2 of 3 bosses 27 are pushed in to guide holes 73 provided on the insulating cover 7.

The insulating cover 7 is made of insulating resin, and. includes a cover body 71 attached to the stator 2 along an upper end surface, and an engagement piece 72 integrally provided on an edge under a lower end of the cover body 71.

The cover body 71 is disposed on the stator 2 along an upper edge and is formed in an arc shape as a whole. The cover body 71 is formed in an L shape in cross section so as to cover the stator 2 from the upper end surface up to a side peripheral surface. The cover body 71 is provided with the guide holes 73, to which bosses 27 are pushed in at 2 locations, facing the bosses 27.

The engagement pieces 72 protrude substantially vertically from the lower edge of the cover body 71, and are provided at 4 locations in this example. In this example, the engagement piece 72 is a tongue that protrudes downward from the lower edge and is in an arc shape having the same curvature as the cover body 71. The engagement piece 72 slightly overhangs radially outward from an outer peripheral surface of the cover body 71. On an upper end outer periphery of the stator 2, meshing sections 12 with which the engagement pieces 72 are meshed are provided at the same 4 locations as the engagement pieces 72.

Each meshing section 12 is a recess conforming the shape of the engagement piece 72, and is lowered in the radial direction from an upper end toward an outer peripheral surface of the attachment stepped surface 11 of the stator 2. The depth in the radial direction of each meshing section 12 is larger than a plate thickness of the engagement piece 72 and the engagement piece 72 is housed inside the meshing section 12.

This means that an outer peripheral surface of the engagement piece 72 is disposed inward from the attachment stepped surface 11. In this way, during attachment of the second bracket 42 to the stator 2, the insulating cover 7 is prevented from being misaligned when, for example, an edge of the second bracket 42 contacts with the engagement piece 72.

In the present invention, each meshing section 12 is displaced with respect to the engagement recess 6 so that it does not coincide with the engagement recess 6 radially nor axially.

In this way, since the meshing section 12 is displaced with respect to the engagement recess 6 so that it does not coincide with the engagement recess 6 radially nor axially, the insulating cover 7 is prevented from being damaged or misaligned even when the second bracket 42 is attached to the stator 2 and a part of the bracket is crimped, causing a stress on the engagement recess 6.

Furthermore, each meshing section 12 is preferably disposed to face the terminal pin 26. Specifically, since the meshing section 12 and the engagement piece 72 are meshingly positioned by facing each meshing section 12 with the terminal pin 26, a short-circuiting path from the terminal pin 26 to the second bracket 42 can be extended so that short-circuit faults can reliably be reduced.

In this example, the insulating cover 7 is formed to cover 4 terminal pins 26 along with a part of a circuit board (not shown) after the circuit board is mounted on the stator 2 along one side (upper end side in FIG. 1) thereof However, the insulating cover 7 may, for example, be formed in an annular shape so as to cover all terminal pins and may only be required to satisfy the requirements as described above.

As described above, according to the present invention, since an engagement recess for securing the crimped part 42*l*, which is generated by crimping a part of a side end face of a bracket, is integrally formed at the time of molding, cutting as in conventional cases is not required and no shavings are generated. In addition, since the engagement recess is disposed to correspond to a cutout, a wall thickness, and therefore the mechanical strength and electrical characteristics, can be secured.

Furthermore, since the engagement recess is displaced from both a gate position and an over flow position at the time of molding, costs associated with designing the mold can be suppressed. Still further, since a meshing section is displaced with respect to the engagement recess so that it does not coincide with the engagement recess radially nor axially, an insulating cover is prevented from being damaged or misaligned even when a stress is exerted on the engagement recess by crimping.

The invention claimed is:
1. A molded motor comprising:
   a stator including a stator core having an annular yoke part, and a plurality of teeth parts extending from an inner peripheral surface of the annular yoke part toward a center thereof,
   an insulator insulatably covering the stator core with teeth surfaces of the teeth parts,
   an outer shell formed around the stator core and the insulator and made of resin, said outer shell having an engagement recess formed on an outer peripheral surface thereof,
   a rotor coaxially disposed at the center of the stator, a connecting wire guide provided on the insulator to stand in an axial direction of the stator core at a position corresponding to the engagement recess, a connecting wire guided by the connecting wire guide, and a bracket having a crimped part, attached to an end face of the stator, said crimped part engaging with the engagement recess when a part of a side end face of the bracket is crimped and secured, wherein the engagement recess is formed in concurrence with formation of the outer shell on the outer peripheral surface of the outer shell, and an insulating cover is provided on an end of the stator for insulating a terminal pin extending in a standing manner from the end of the stator, and the outer shell is provided with a meshing section that meshes with a part of the insulating cover, and wherein the engagement recess is provided at a position not to coincide with the meshing section radially nor axially.

2. The molded motor according to claim 1, wherein the connecting wire guide has a side surface on an inner diameter side formed in an arch shape as a guide surface for the connecting wire.

3. The molded motor according to claim 2, wherein the connecting wire guide is arranged on the inner diameter side from the outer periphery of the insulator.

4. The molded motor according to claim 2, wherein the engagement recess is formed in a trapezoidal shape such that an opening width progressively decreases radially inward from the outer peripheral surface of the outer shell.

5. The molded motor according to claim 3, wherein the engagement recess is formed in a trapezoidal shape such that an opening width progressively decreases radially inward from the outer peripheral surface of the outer shell.

6. The molded motor according to claim 1, wherein the engagement recess is located at a position to avoid a gate position and the over flow position at the time of molding of the outer shell.

7. The molded motor according to claim 2, wherein the engagement recess is located at a position to avoid a gate position and the over flow position at the time of molding of the outer shell.

8. The molded motor according to claim 3, wherein the engagement recess is located at a position to avoid a gate position and the over flow position at the, time of molding of the outer shell.

9. The molded motor according to claim 4, wherein the engagement recess is located at a position to avoid a gate position and the over flow position at the time of molding of the outer shell.

10. The molded motor according to claim 5, wherein the engagement recess is located at a position to avoid a gate position and the over flow position at the time of molding of the outer shell.

* * * * *